United States Patent
Ponnuchamy et al.

(10) Patent No.: US 12,534,009 B2
(45) Date of Patent: Jan. 27, 2026

(54) REMOVABLE COMPONENT OF A DUMP BODY OF A MACHINE

(71) Applicant: Caterpillar Global Mining Equipment LLC, Denison, TX (US)

(72) Inventors: Vaitheeswaran Ponnuchamy, Chennai (IN); Daniel Raymond Hettinger, Monticello, IL (US); Christopher Lynn Wylin, Tucson, AZ (US)

(73) Assignee: Caterpillar Global Mining Equipment LLC, Denison, TX (US)

( * ) Notice: Subject to any disclaimer, the term of this patent is extended or adjusted under 35 U.S.C. 154(b) by 372 days.

(21) Appl. No.: 18/141,772

(22) Filed: May 1, 2023

(65) Prior Publication Data

US 2024/0367570 A1 Nov. 7, 2024

(51) Int. Cl.
*B60P 1/00* (2006.01)
*B60P 1/28* (2006.01)

(52) U.S. Cl.
CPC .................... *B60P 1/286* (2013.01)

(58) Field of Classification Search
CPC .................... B60P 1/286; B60P 1/28
See application file for complete search history.

(56) References Cited

U.S. PATENT DOCUMENTS

| | | |
|---|---|---|
| 3,923,337 A | 12/1975 | Kershaw et al. |
| 6,854,808 B2 * | 2/2005 | Kostecki ................ B60R 13/01 |
| | | 37/453 |
| 8,096,607 B2 * | 1/2012 | Dickerson .............. B60P 1/286 |
| | | 105/364 |
| 9,308,875 B2 * | 4/2016 | Burstrom ............... B60R 13/01 |
| 9,868,405 B1 * | 1/2018 | Fischer .................. B60R 13/01 |
| 10,000,144 B2 | 6/2018 | Zamorano et al. |
| 2005/0093338 A1 * | 5/2005 | Medel .................... B60P 1/283 |
| | | 296/183.1 |
| 2011/0227366 A1 | 9/2011 | Lindström |
| 2012/0169109 A1 | 7/2012 | Rivera et al. |
| 2018/0290580 A1 | 10/2018 | Maiorana |

FOREIGN PATENT DOCUMENTS

| | | |
|---|---|---|
| CN | 203332236 U | 12/2013 |
| CN | 210174990 U | 3/2020 |
| EP | 2994345 B1 | 12/2017 |
| JP | 2007223507 A | 9/2007 |
| WO | 2013059954 A1 | 5/2013 |
| WO | 2020005480 A1 | 1/2020 |
| WO | 2022027148 A1 | 2/2022 |

OTHER PUBLICATIONS

Written Opinion and International Search Report for Int'l. Patent Appln. No. PCT/US2024/023186, mailed Aug. 7, 2024 (11 pgs).

* cited by examiner

*Primary Examiner* — Steven O Douglas (57) ABSTRACT

A machine may include a dump body that includes a removable component and a base component, wherein: the removable component includes: a first sidewall, a second sidewall, a floor disposed between the first sidewall and the second sidewall, and a welding surface that extends across a surface of the first sidewall, a surface of the second sidewall, and a surface of the floor; and the removable component is connected to the base component at the welding surface of the removable component.

20 Claims, 13 Drawing Sheets

REMOVABLE COMPONENT OF A DUMP BODY OF A MACHINE

TECHNICAL FIELD

The present disclosure relates generally to a dump body of a machine and, for example, to a removable component of the dump body.

BACKGROUND

Dump bodies are manufactured to fit on machines such as trucks (e.g., to form dump trucks). These dump bodies typically consist of structural components such as a floor, side walls coupled to sides of the floor, and a front wall coupled to a front end of the floor. A dump body of a machine can be filled with material, and then can be raised by a hydraulic system of the machine so as to dump (e.g., to eject) the material from the dump body.

A machine that includes a dump body typically operates at a worksite to transport or move material from one location to another. The material may include, for example, gravel, sand, dirt, or other materials. Due to an abrasive nature of the material, performing fill and dump operations subjects the dump body to wear and tear. In many cases, a rear portion of the dump body is subject to more wear and tear than other portions of the dump body. For example, during a dump operation, material may fall, or slide, from a forward portion of the dump body onto the rear portion, which leads to additional wear and tear on the rear portion. Further, because the rear portion of the dump body is located at a rear of the machine, the rear portion often comes in contact with a berm, an apron, or another object at the worksite during a dump operation, which causes contact damage to the rear portion. Continual wear and tear and contact damage to the rear portion of the dump body can compromise a structural integrity of the dump body and therefore reduce an overall operable life of the dump body, even when other portions of the dump body are not as affected by wear and tear and/or contact damage.

International Patent Application Publication No. WO2022027148 (the '148 publication) discloses a replacement tail for a truck hopper. Per the '148 publication, the replacement tail includes an attachment end that comprises a fixing section, for example, in the form of a flange, and comprising one or more releasable fixing points, for example, holes for the arrangement of releasable fastening elements, such as bolts; and at least one coupling section, comprising one or more releasable fixing points, and arranged to releasably receive and fix at least one coupling element comprising one or more releasable fixing points. However, attaching the replacement tail to a truck hopper (e.g., using bolts) can be time consuming and complex, and because of the "releasable" nature of the fixing points and the fastening elements, does not provide a strong enough connection to allow the replacement tail to remain robustly attached for some fill and dump operations at a worksite.

The removable component of a dump body of a machine of the present disclosure solves one or more of the problems set forth above and/or other problems in the art.

SUMMARY

A removable component of a dump body of a machine may include a first sidewall; a second sidewall; a floor disposed between the first sidewall and the second sidewall; and a welding surface, wherein: the welding surface extends across a surface of the first sidewall, a surface of the second sidewall, and a surface of the floor.

A dump body of a machine may include a removable component that includes: a first sidewall, a second sidewall, a floor disposed between the first sidewall and the second sidewall, and a welding surface that extends across a surface of the first sidewall, a surface of the second sidewall, and a surface of the floor; and a base component, wherein: the removable component is connected to the base component along the welding surface of the removable component.

A machine may include a dump body that includes a removable component and a base component, wherein: the removable component includes: a first sidewall, a second sidewall, a floor disposed between the first sidewall and the second sidewall, and a welding surface that extends across a surface of the first sidewall, a surface of the second sidewall, and a surface of the floor; and the removable component is connected to the base component at the welding surface of the removable component.

DETAILED DESCRIPTION

This disclosure relates to a removable component of a dump body, which is applicable to any machine that includes a dump body. For example, the machine may be configured to perform operations associated with an industry, such as mining, construction, transportation, or any other industry.

Figure 1:
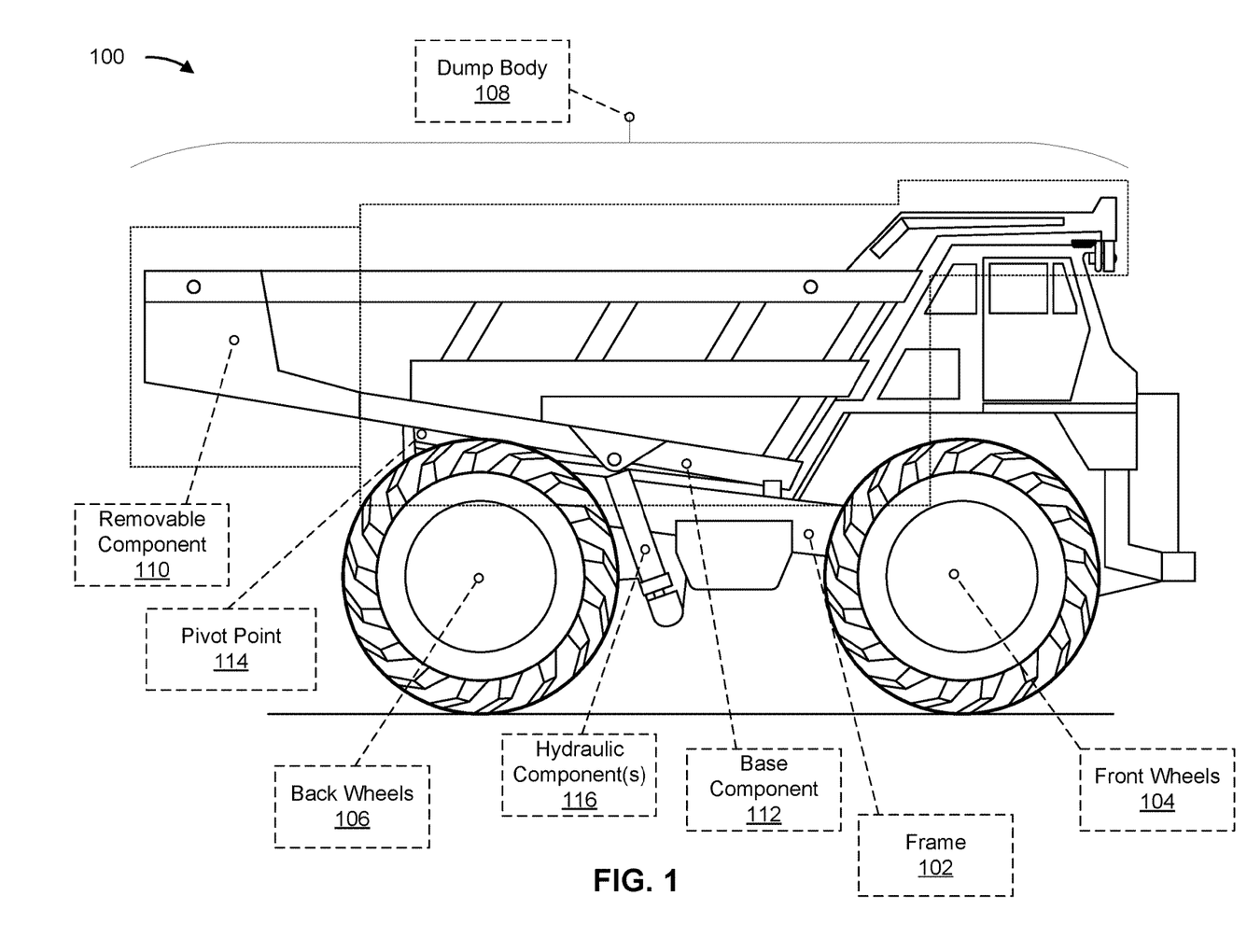
FIG. 1 is a diagram of an example machine that includes a dump body described herein.

FIG. 1 is a diagram (e.g., a side-view) of an example machine 100 described herein. The machine 100 may be a mobile machine or vehicle, and may include a dump truck, or another type of machine. Further, the machine 100 may be a manned machine or an unmanned machine. The machine 100 may be fully-autonomous, semi-autonomous, or remotely operated.

As further shown in FIG. 1, the machine 100 may have a frame 102 supported by front wheels 104 and rear wheels 106 (including respective tires). The front wheel 104 and the rear wheels 106 may be connected to the frame 102 by front suspension members and rear suspension systems, respectively (not expressly shown).

The machine 100 may include a dump body 108, which may be supported by the frame 102. The dump body 108 may be configured as a receptacle to receive material (e.g., at a worksite). The dump body 108 may include a removable component 110 and a base component 112. As shown in FIG. 1, the removable component 110 may be associated with a rear portion of the dump body 108, and the base component 112 may be associated with a front portion of the dump body 108. The removable component 110 may be connected to the base component 112 to form the dump body 108 such that the dump body 108 is a unified dump body. The removable component 110 and the base component 112 are further described herein in relation to FIGS. 2A-2F and 3A-3F.

The dump body 108 may be pivotably coupled or attached to a portion of the frame 102 (e.g., at a rear portion of the frame 102). Thus, the dump body 108 may be pivoted (e.g., around a pivot point 114) from a lowermost or rest position (e.g., a not raised position), such as shown in FIG. 1, to a raised position (e.g., a fully raised position). That is, the dump body 108 may be pivoted at the rear portion of the frame 102 to raise or lower a portion of the dump body 108 in front of the pivot point 114 (and hence move a portion of the dump body 108 behind the pivot point 114 in an opposite direction). Such pivoting of the dump body 108 may raise a front portion of the dump body 108 and may lower a rear portion of the dump body 108, such as to dump material from within the dump body 108. Additionally, pivoting of the dump body 108 to lower the front portion of the dump body 108 and to raise the rear portion of the dump body 108 (e.g., to the rest position) may allow the dump body 108 to receive material in the dump body 108. The pivoting may be performed using one or more hydraulic components 116 (e.g., that may include one or more pumps, one or more motors, one or more valves, one or more cylinders, and/or one or more pistons, among other examples) operatively coupled to the frame 102 and the dump body 108.

As indicated above, FIG. 1 is provided as an example. Other examples may differ from what is described in connection with FIG. 1.

Figure 2A:
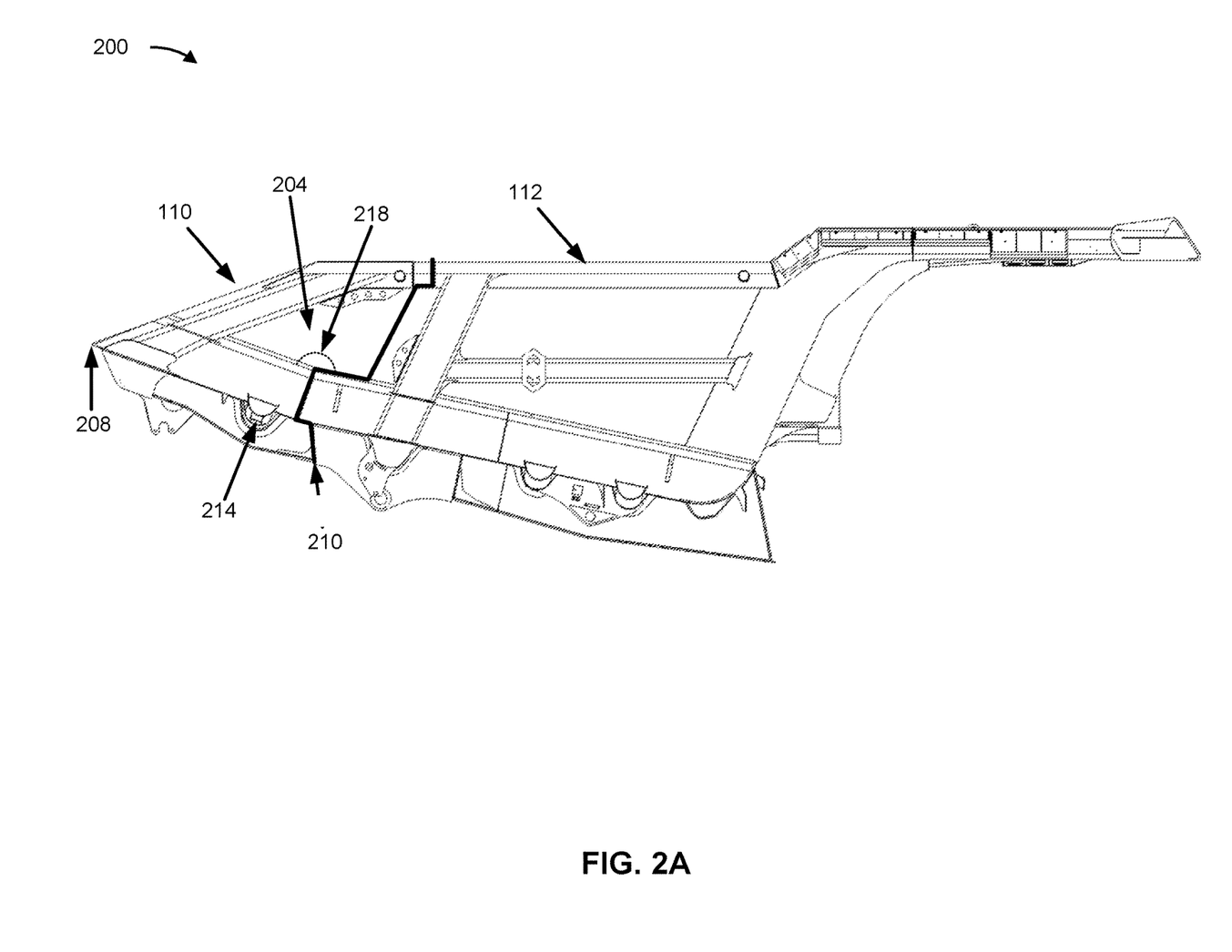
FIGS. 2A-2F are diagrams of one or more example implementations described herein associated with a first configuration of the dump body.
Figure 2B:
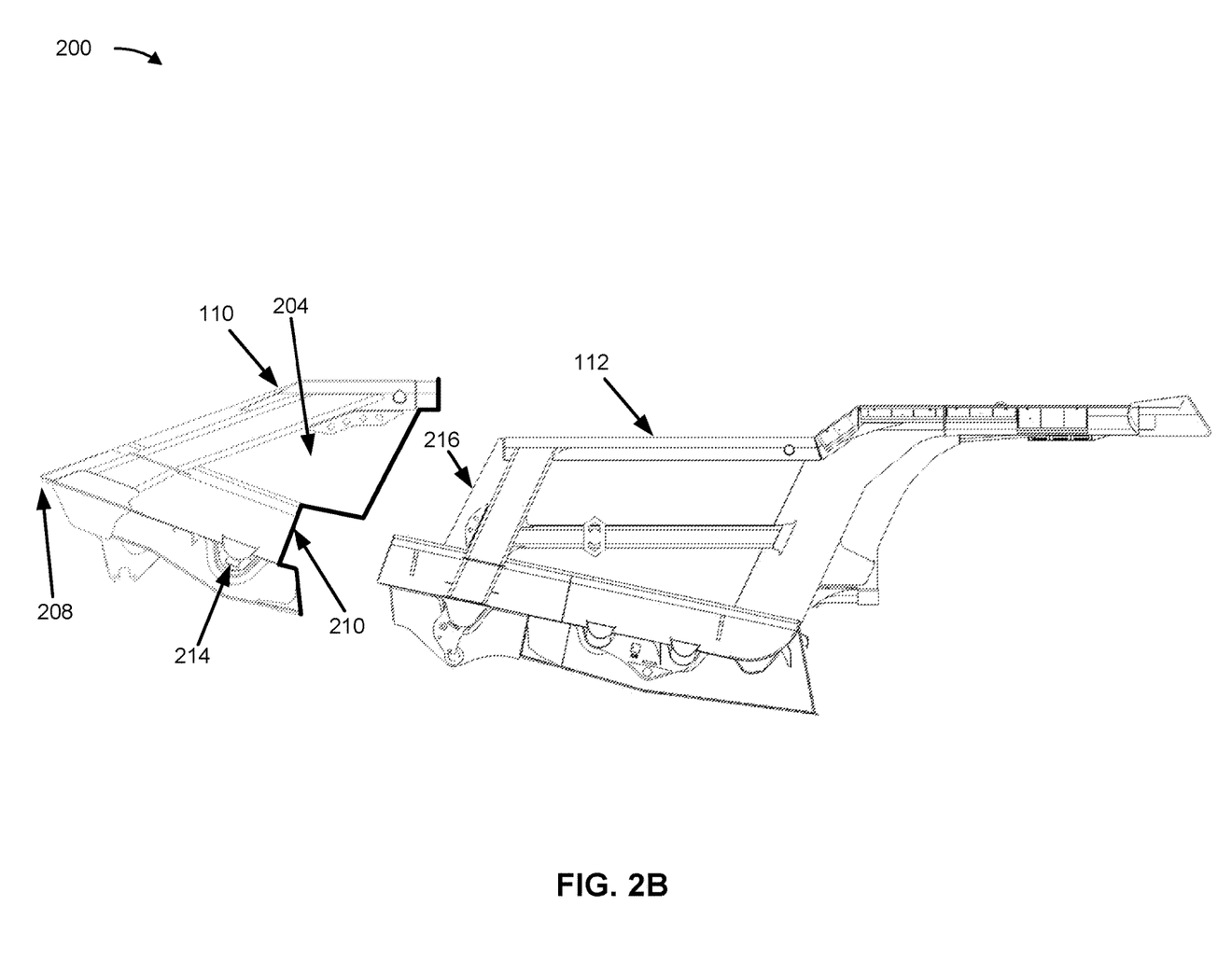
Figure 2C:
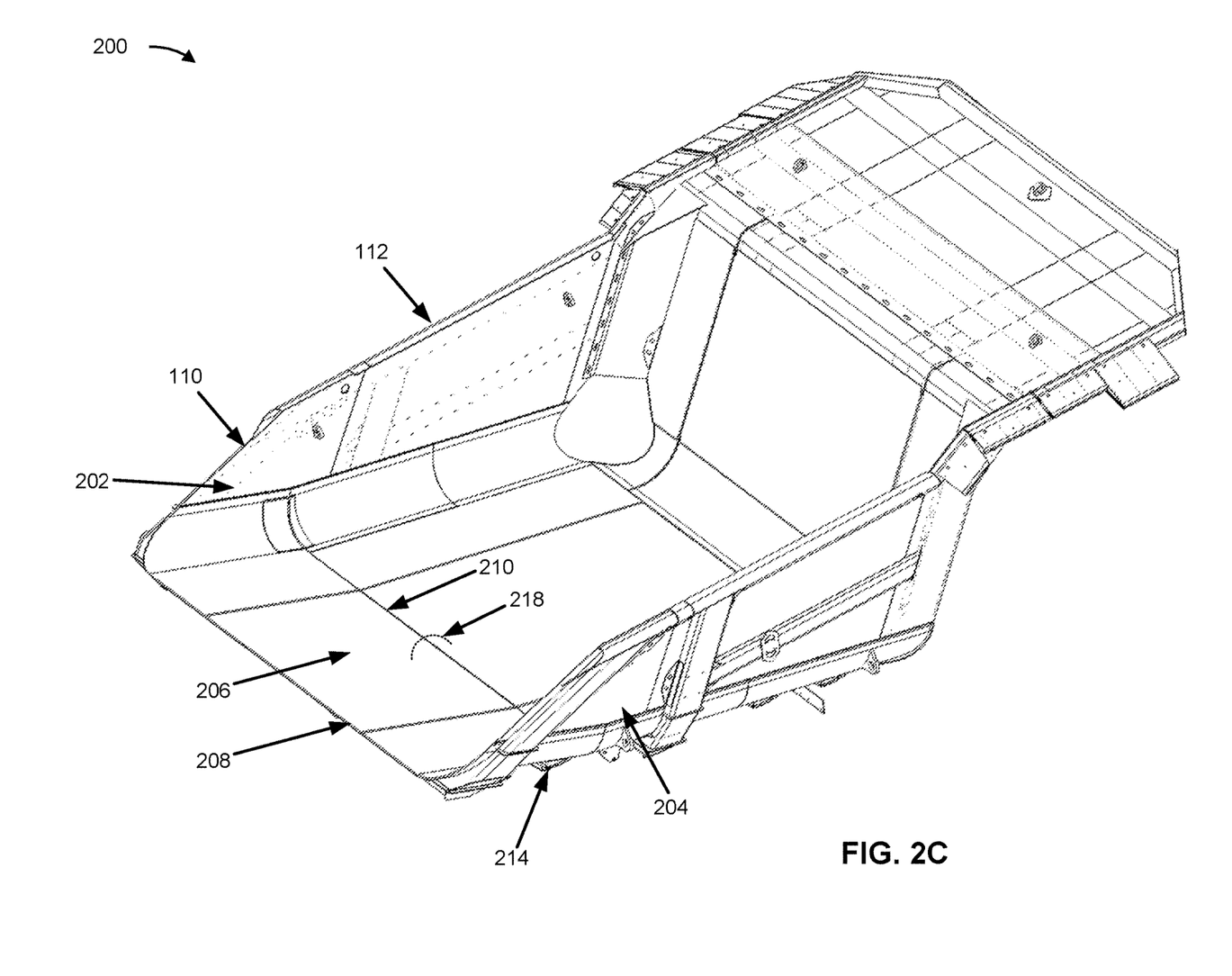
Figure 2D:
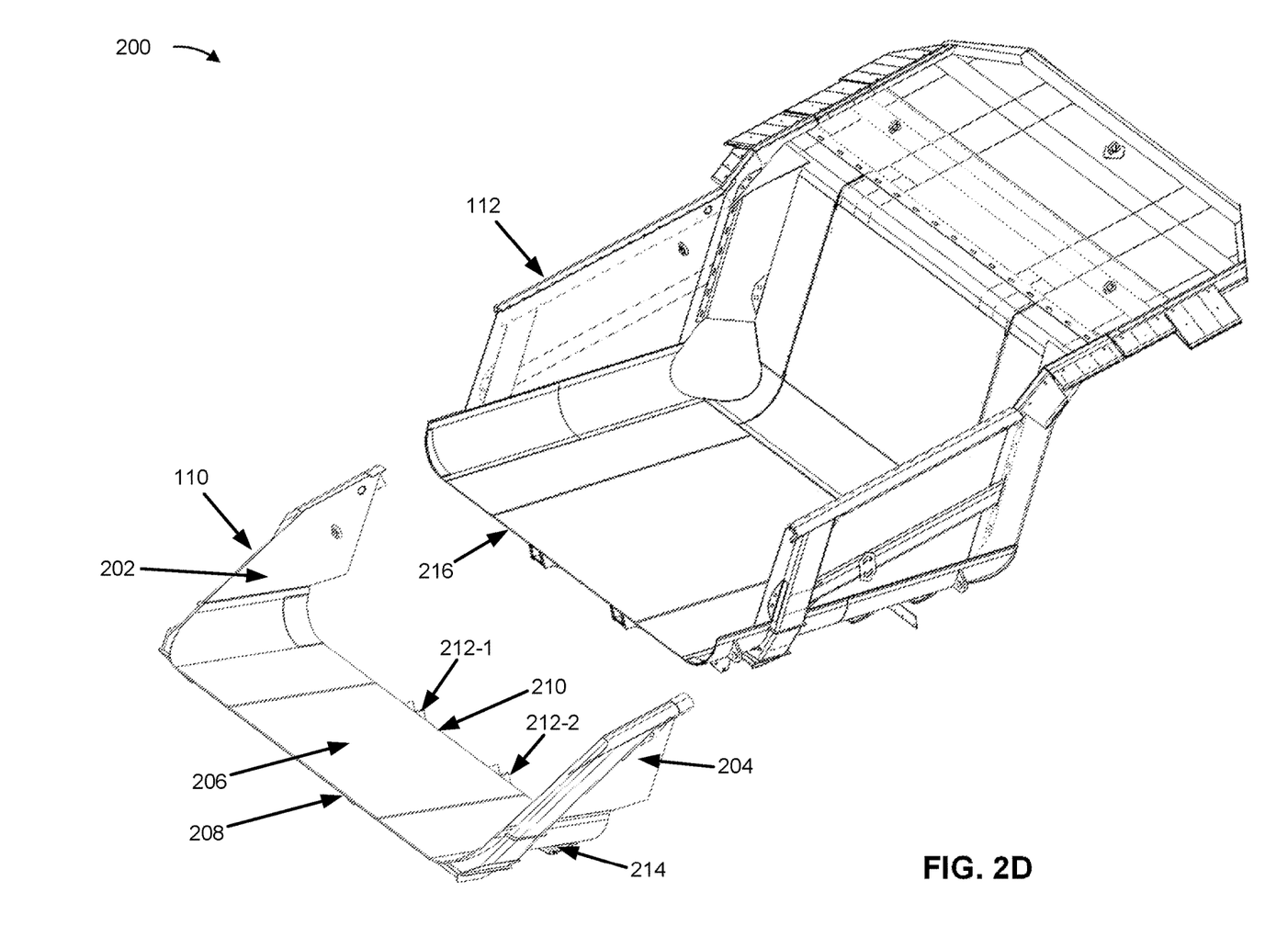
Figure 2E:
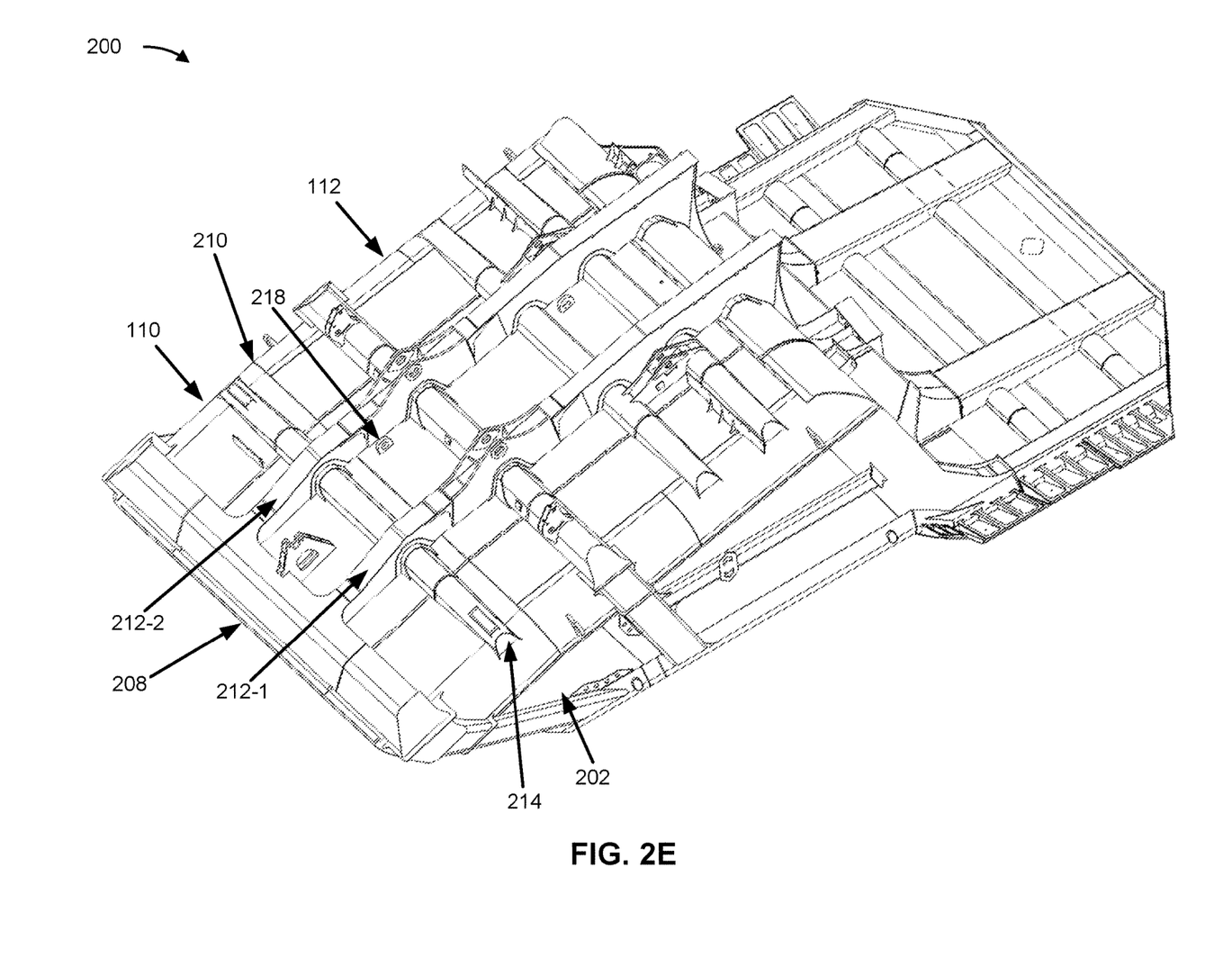
Figure 2F:
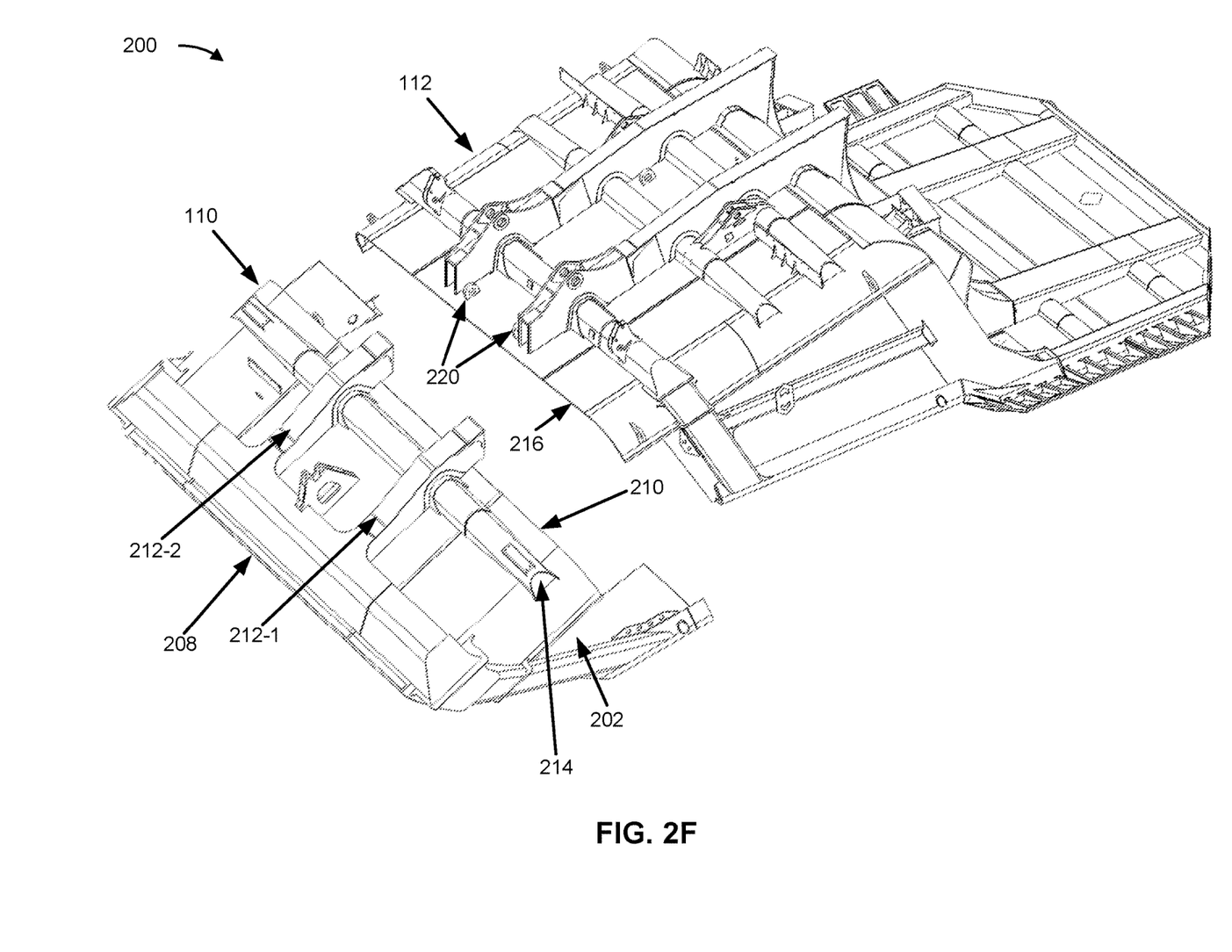

FIGS. 2A-2F are diagrams of one or more example implementations 200 described herein associated with a first configuration of the dump body 108 (e.g., that includes the removable component 110 and the base component 112). FIG. 2A shows a side (e.g., a right side) view of the removable component 110 connected to the base component 112; FIG. 2B shows a side view (e.g., a right side) of the removable component 110 disconnected from the base component 112; FIG. 2C shows an angled top-down view of the removable component 110 connected to the base component 112; FIG. 2D shows an angled top-down view of the removable component 110 disconnected from the base component 112; FIG. 2E shows an angled bottom-up view of the removable component 110 connected to the base component 112; and FIG. 2F shows an angled bottom-up view of the removable component 110 disconnected from the base component 112.

As shown in FIGS. 2A-2F, the removable component 110 may include a first sidewall 202, a second sidewall 204, and a floor 206. The floor 206 may be disposed between the first sidewall 202 and the second sidewall 204, and may be connected to each of the first sidewall 202 and the second sidewall 204 (e.g., via one or more welds). The first sidewall 202 and the second sidewall 204 may extend in a first direction (e.g., a vertical direction) and the floor 206 may extend in a second direction (e.g., a horizontal direction) that is orthogonal to (or substantially orthogonal to) the first direction.

As shown in FIGS. 2A-2F, each of the first sidewall 202 and the second sidewall 204 may have a height that varies (e.g., along a length of the dump body 108 from the rear portion of the dump body 108 to the front portion of the dump body 108). As further shown in FIGS. 2C-2D, the first sidewall 202 and the second sidewall 204 may have respective curved portions (e.g., a convex portion), such as at locations where the first sidewall 202 and the second sidewall 204 connect to the floor 206. In this way, the first sidewall 202 and the second sidewall 204 may prevent jamming of material into a "corner" formed where the floor 206 connects to the first sidewall 202 or the second sidewall 204.

As further shown in FIGS. 2A-2F, the removable component 110 may include an end surface 208. The end surface 208 may be an end surface of the dump body 108 when the removable component 110 is connected to the base component 112. The end surface 208 may include a surface of the first sidewall 202, a surface of the second sidewall 204, and/or a surface of the floor 206. For example, as shown in shown in FIGS. 2A-2F, the end surface 208 may include respective surfaces of the first sidewall 202, the second sidewall 204, and/or the floor 206 that are tapered, rounded, or otherwise formed to act as an end surface of the dump body 108.

As further shown in FIGS. 2A-2F, the removable component 110 may include a welding surface 210. The welding surface 210 may extend across a surface of the first sidewall 202, a surface of the second sidewall 204, and/or a surface of the floor 206. For example, as shown in shown in FIGS. 2A-2F, the welding surface 210 may be an uninterrupted surface that extends across respective surfaces of the first sidewall 202, the second sidewall 204, and/or the floor 206. The welding surface 210 may be configured to be smooth, defect-minimized (e.g., with a minimal amount of cracks, pits, or other defects), clean (e.g., with a minimal amount of surface contaminants), and/or otherwise formed to act as a welding surface (e.g., to allow the welding surface 210 to be welded to another welding surface via one or more welds, as described herein).

As further shown in FIGS. 2D-2F, the removable component 110 may include a plurality of rails 212 (e.g., shown as a first rail 212-1 and a second rail 212-2), such as on a bottom of the removable component 110. The plurality of rails 212 may extend on the bottom of the removable component 110 in a direction that is parallel to (e.g., within a tolerance, which may be less than or equal to 1 degree, 2 degrees, 3 degrees, 4 degrees, or 5 degrees) an axis that extends from the end surface 208 to the welding surface 210 of the removable component 110. The plurality of rails 212 may provide structural support for the removable component 110 (e.g., may provide stiffness to the bottom of the removable component 110 in directions that are parallel to the axis). In some implementations, the welding surface 210 may include respective surfaces of the plurality of rails 212. For example, as shown in FIGS. 2D-2F, the welding surface 210 may include a surface of the first rail 212-1 and a surface of the second rail 212-2.

As further shown in FIGS. 2A-2F, the removable component 110 may include at least one rib 214, such as on the bottom of the removable component 110. The at least one rib 214 may extend in a direction that is orthogonal to (e.g., within a tolerance, which may be less than or equal to 1 degree, 2 degrees, 3 degrees, 4 degrees, or 5 degrees) a direction in which the plurality of rails 212 extend (e.g., the direction of the at least one rib 214 may be orthogonal to the axis that extends from the end surface 208 to the welding surface 210 of the removable component 110). The at least one rib 214 may extend between the plurality of rails 212 (e.g., the first rail 212-1 and the second rail 212-2 shown in FIGS. 2E-2F). The at least one rib 214 may provide structural support for the removable component 110 (e.g., may provide stiffness to the bottom of the removable component 110 in a direction that is orthogonal to the axis that extends from the end surface 208 to the welding surface 210 of the removable component 110).

In some implementations, the welding surface 210 of the removable component 110 may be configured to mate with a welding surface 216 of the base component 112 of the dump body 108 of the machine 100, as further described herein. For example, the welding surface 210 of the removable component 110 and the welding surface 216 of the base component 112 of the dump body 108 may be configured to be connected via one or more welds (e.g., one or more butt welds, tee welds, lap welds, and/or other types of welds), along the welding surface 210 and the welding surface 216, to allow the removable component 110 and the base component 112 to form a unified dump body.

The base component 112 may include a first sidewall, a second sidewall, and/or floor (e.g., that respectively mate with the first sidewall 202, the second sidewall 204, and/or the floor 206 of the removable component 110). The floor of the base component 112 may be parallel to a reference axis, and at least a portion of the floor 206 of the removable component 110 may be disposed at a non-zero angle 218 to the reference axis when the welding surface 210 of the removable component 110 and the welding surface 216 of the base component 112 component are connected (e.g., via one or more welds). In this way, at least a portion of the floor 206 of the removable component 110 may be referred to as having a "kick-up," such as compared to the floor of the base component 112.

The base component 112 may include one or more pivot brackets 220. The one or more pivot brackets 220 may be configured to pivotally connect the base component 112 (and therefore the dump body 108) to the machine 100. Accordingly, the one or more pivot brackets 220 may be configured to act as the pivot point 114 described herein in relation to FIG. 1.

As indicated above, FIGS. 2A-2F are provided as an example. Other examples may differ from what is described in connection with FIGS. 2A-2F.

Figure 3A:
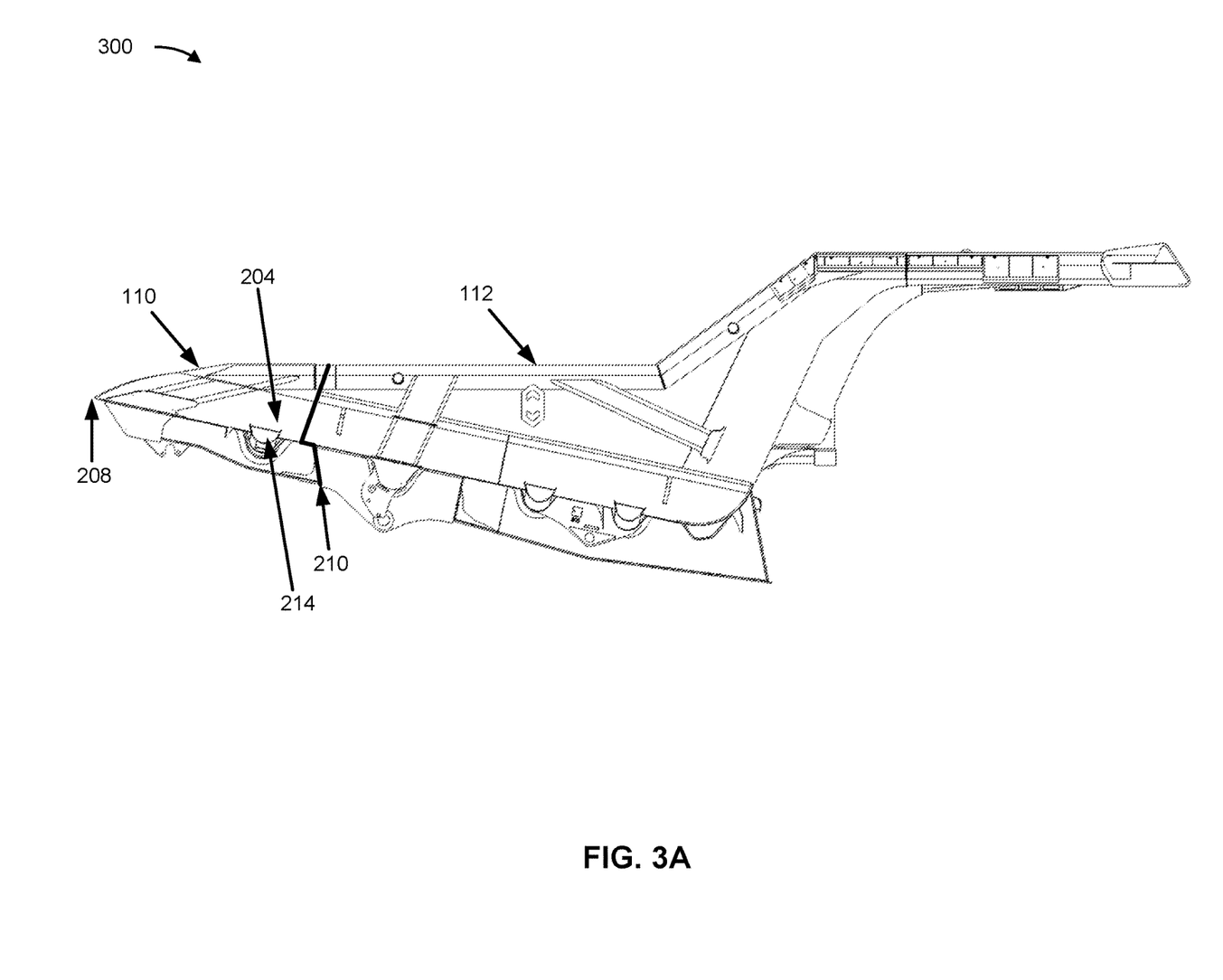
FIGS. 3A-3F are diagrams of one or more example implementations described herein associated with a second configuration of the dump body.
Figure 3B:
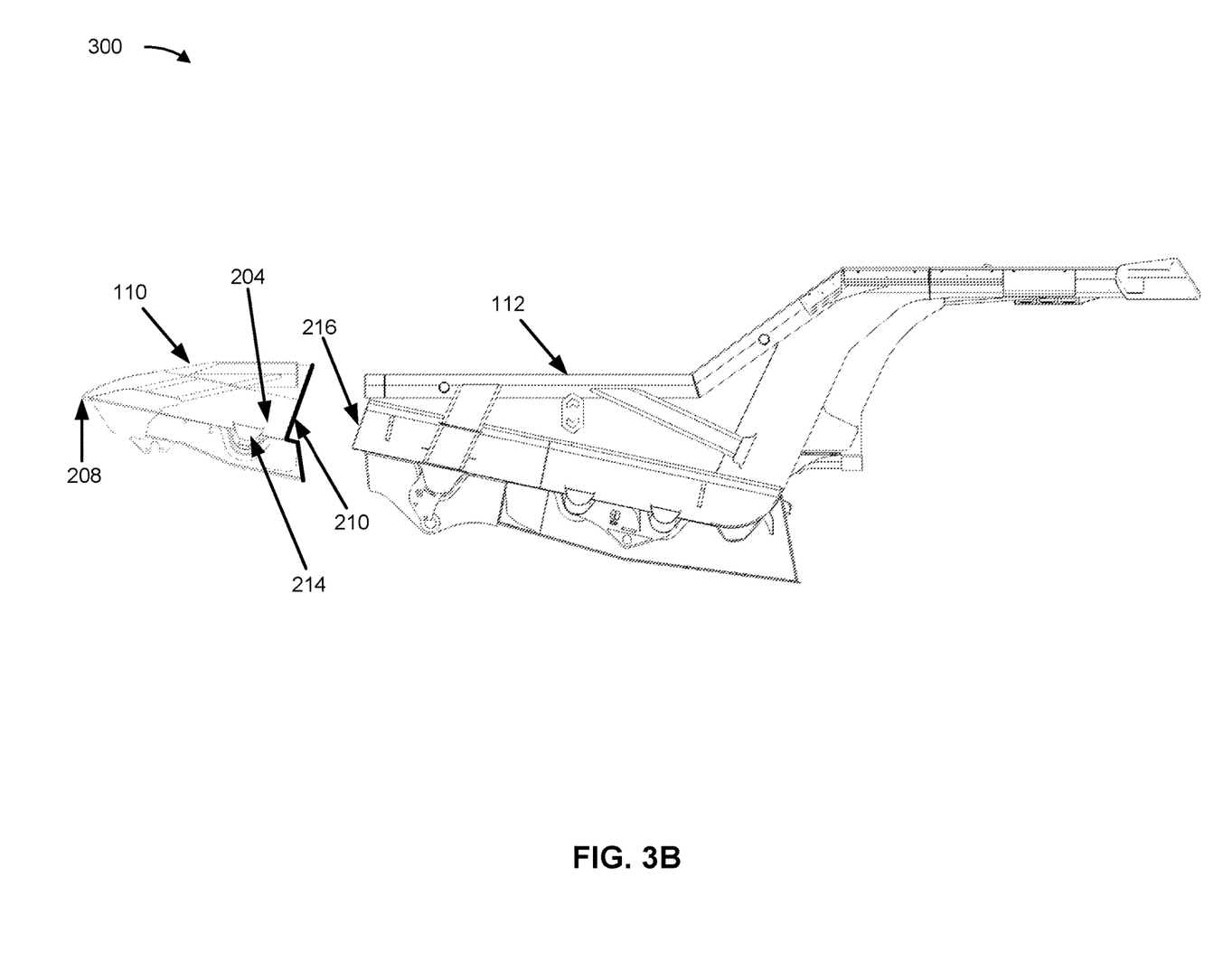
Figure 3C:
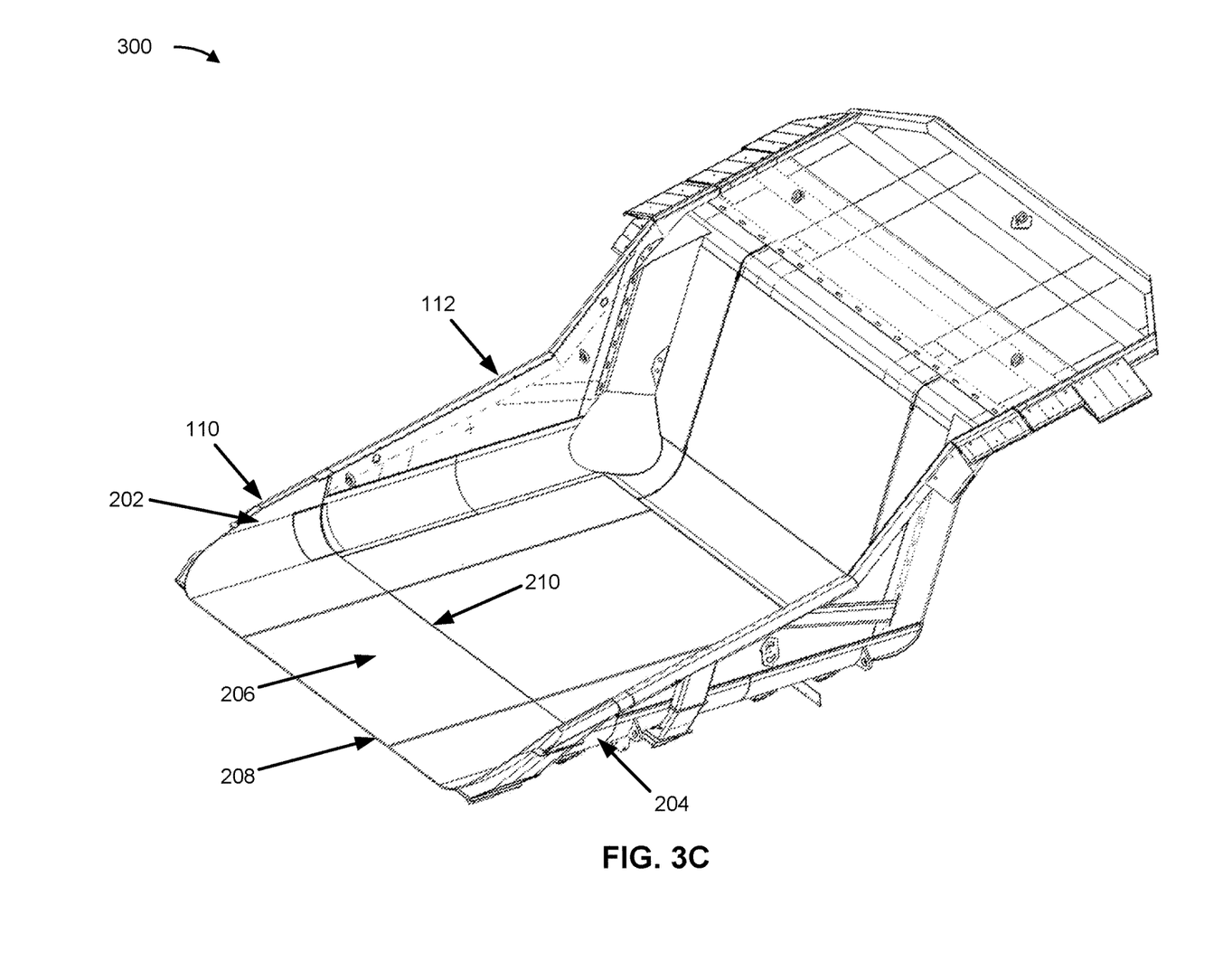
Figure 3D:
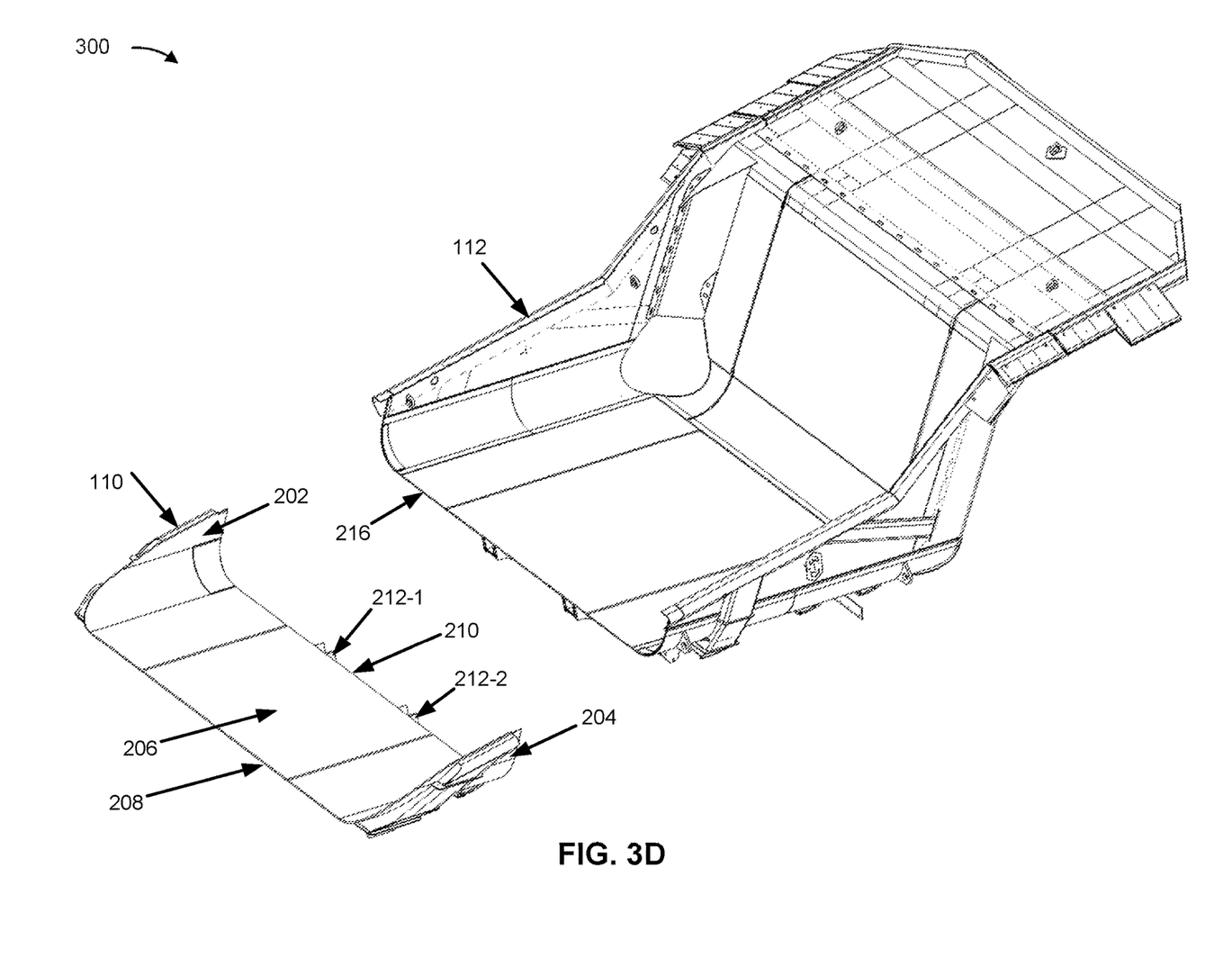
Figure 3E:
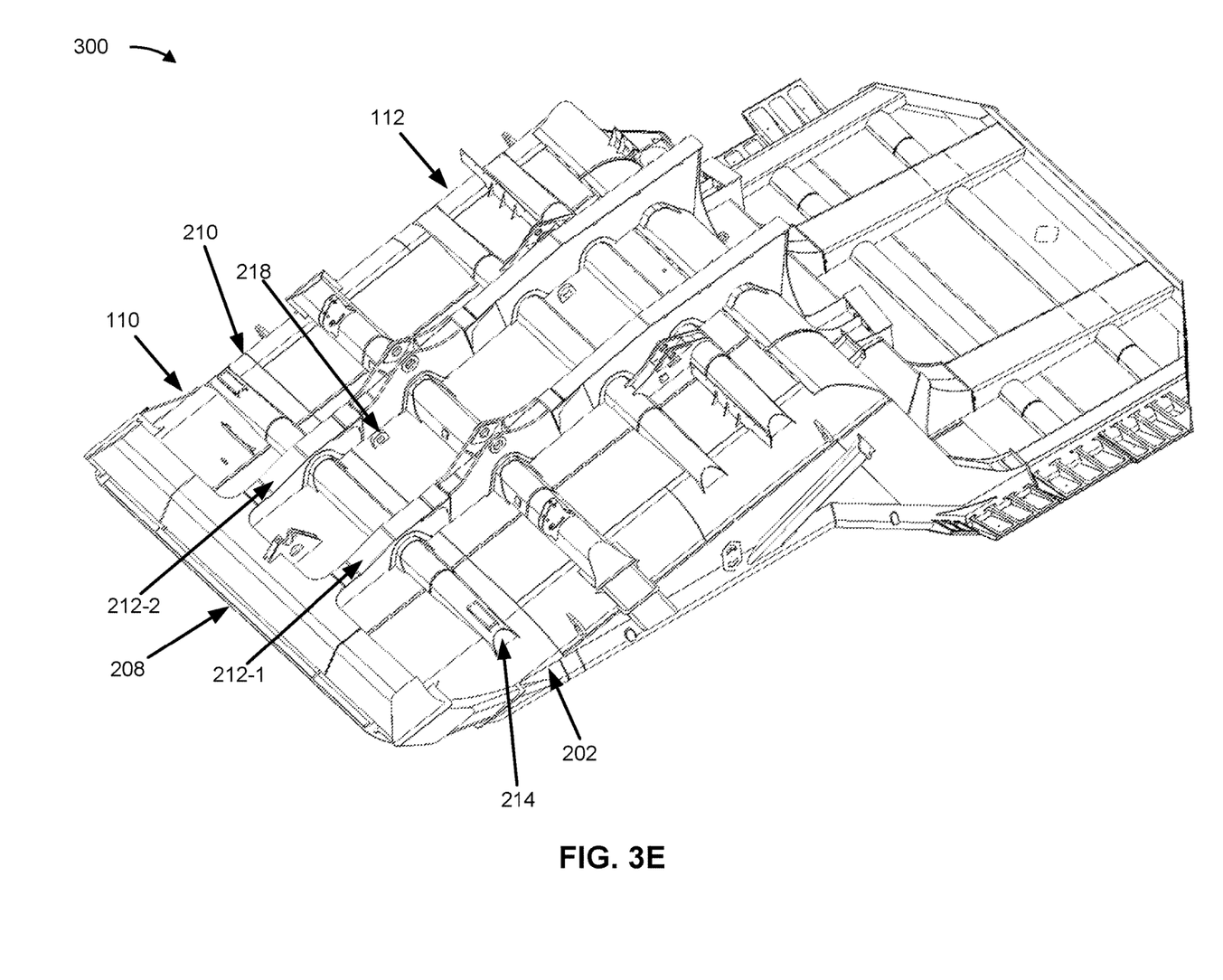
Figure 3F:
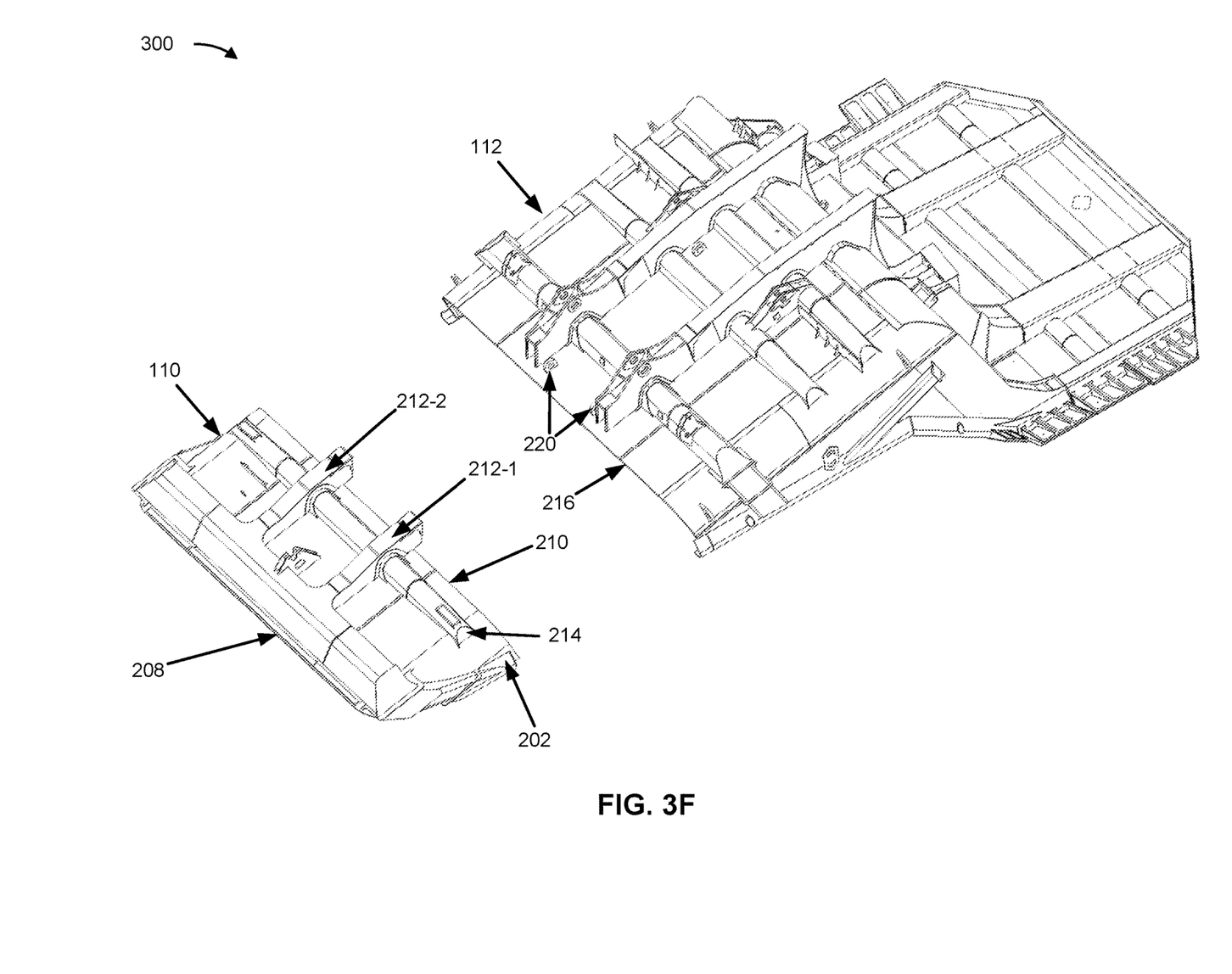

FIGS. 3A-3F are diagrams of one or more example implementations 300 described herein associated with a second configuration of the dump body 108 (e.g., that includes the removable component 110 and the base component 112). FIG. 3A shows a side (e.g., a right side) view of the removable component 110 connected to the base component 112; FIG. 3B shows a side view (e.g., a right side) of the removable component 110 disconnected from the base component 112; FIG. 3C shows an angled top-down view of the removable component 110 connected to the base component 112; FIG. 3D shows an angled top-down view of the removable component 110 disconnected from the base component 112; FIG. 3E shows an angled bottom-up view of the removable component 110 connected to the base component 112; and FIG. 3F shows an angled bottom-up view of the removable component 110 disconnected from the base component 112.

As shown in FIGS. 3A-3F, the removable component 110 may include the first sidewall 202, the second sidewall 204, the floor 206, the end surface 208, the welding surface 210, the plurality of rails 212, and/or the at least one rib 214 (e.g., as described herein in relation to FIGS. 2A-2F). Accordingly, each of the first sidewall 202 and the second sidewall 204 may have a height that varies (e.g., along a length of the dump body 108 from the rear portion of the dump body 108 to the front portion of the dump body 108). As shown in FIGS. 3A-3F, each of the first sidewall 202 and the second sidewall 204 may have a different height profile as compared to height profiles of the first sidewall 202 and the second sidewall 204 shown in FIGS. 2A-2F. In this way, the second configuration of the dump body 108 shown in FIGS. 3A-3F may be different than the first configuration of the dump body 108 shown in FIGS. 2A-2F.

As indicated above, FIGS. 3A-3F are provided as an example. Other examples may differ from what is described in connection with FIGS. 3A-3F.

INDUSTRIAL APPLICABILITY

The disclosed removable component (e.g., the removable component 110) may be used for any machine that includes a dump body (e.g., a dump body 108). Notably, the removable component includes a welding surface that extends, uninterrupted, across respective surfaces of sidewalls and a floor of the removable component (e.g., laterally across an entirety of the removable component). The welding surface is configured to mate with, and be connected to, a welding surface of a base component (e.g., the base component 112) of the dump body. Accordingly, the welding surface of the removable component and the welding surface of the base component can be connected via one or more or welds (e.g., along an entirety of an interface between the welding surface of the removable component and the welding surface of the base component).

This welded connection between the removable component and the base component provides a strong, robust connection that allows the removable component to remain robustly attached during fill and dump operations associated with the dump body. Further, because the removable component is not connected to the base component via fasteners, such as bolts or other releasable component, the dump body forms a unified dump body (e.g., with no gaps between the interface of the respective welding surfaces of the removable component and the base component). This prevents, or at least minimizes, formation of sections or areas of the dump body (e.g., where material can become jammed, such as at the interface of the respective welding surfaces of the removable component and the base component) that would otherwise hinder fill and dump operations. Accordingly, the removable component (e.g., when connected to the base component of the dump body) facilitates improved fill and dump operations (e.g., over other replaceable components, such as liners or other components, that are releasably connected to the dump body).

Additionally, the releasable component has a kick-up, which provides for (e.g., when the releasable component is connected to the base component) an increased ground clearance of the releasable component (e.g., when the dumb body is in a fully raised position), which minimizes an amount of contact damage to the releasable component. The kick-up also changes minimizes or mitigates a wear rate of the floor and sidewalls of the releasable component (e.g., at a rear portion of the dump body) by allowing for material to more gradually fall, or slide, from a forward portion of the dump body onto the releasable component (e.g., at the rear portion of the dump body). This improves an operating life of the releasable component (e.g., as compared to a releasable component without a kick-up), and therefore an operating life of the dump body.

Further, connecting the removable component to the base component via one or more welds is a straightforward process. When the replaceable component needs to be replaced (e.g., at an end of an operating life of the replaceable component, such as due to wear and tear and/or contact damage), the replaceable component may be removed by cutting (e.g., at the welding surface of the replaceable component) the replaceable component from the base component. A new replaceable component then may be connected to the base component (e.g., via one or more welds between the respective welding surfaces of the new replaceable component and the base component). This cutting and welding process provides a straightforward means to extend the overall operating life of the dump body, as compared to attempting to remove and replace fasteners via fixing points that have been damaged or otherwise deformed (and therefore are not able to be manipulated, such as to loosen or tighten, using typical loosening and fastening tools).

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A removable component of a dump body of a machine, comprising:
   a first sidewall;
   a second sidewall;
   a first rail;
   a second rail;
   a floor disposed between the first sidewall and the second sidewall; and
   a welding surface that extends across a surface of the first sidewall, a surface of the second sidewall, a surface of the floor, a surface of the first rail, and a surface of the second rail.

2. The removable component of claim 1, further comprising:
   a rib that extends between the first rail and the second rail.

3. The removable component of claim 1, wherein:
   the welding surface of the removable component is to mate with a welding surface of a base component of the dump body of the machine.

4. The removable component of claim 3, wherein:
   the welding surface of the removable component is to be connected to the welding surface of the base component via one or more welds to allow the removable component and the base component to form a unified dump body.

5. The removable component of claim 3, wherein at least a portion of the floor of the removable component is disposed at a non-zero angle to a reference axis parallel to a floor of the base component when the welding surface of the removable component is connected to the welding surface of the base component.

6. A dump body of a machine, comprising:
   a removable component that includes:
      a first sidewall,
      a second sidewall,
      a plurality of rails,
      a floor disposed between the first sidewall and the second sidewall, and
      a welding surface that extends across a surface of the first sidewall, a surface of the second sidewall, a surface of the floor, and a surface of the plurality of rails; and
   a base component, wherein:
      the removable component is connected to the base component along the welding surface of the removable component.

7. The dump body of claim 6, wherein the dump body is a unified dump body based on the removable component being connected to the base component at the welding surface of the removable component.

8. The dump body of claim 6, wherein the removable component is connected to the base component at the welding surface of the removable component via one or more welds.

9. The dump body of claim 6, wherein the welding surface of the removable component is connected to a welding surface of the base component that mates with the welding surface of the removable component.

10. The dump body of claim 6, wherein the removable component is associated with a rear portion of the dump body, and the base component is associated with a front portion of the dump body.

11. The dump body of claim 6, wherein the base component includes a floor that is parallel to a reference axis, and
   wherein at least a portion of the floor of the removable component is disposed at a non-zero angle to the reference axis.

12. The dump body of claim 6, wherein the removable component further includes at least one rib that extends in a direction that is orthogonal to a direction in which the plurality of rails extend.

13. The dump body of claim 6, wherein the base component includes one or more pivot brackets for pivotally connecting the dump body to the machine.

14. A machine, comprising:
   a dump body that includes a removable component and a base component, wherein:
      the removable component includes:
         a first sidewall,
         a second sidewall,
         a plurality of rails,
         a floor disposed between the first sidewall and the second sidewall, and
         a welding surface that extends across a surface of the first sidewall, a surface of the second sidewall, a surface of the floor, and a surface of the plurality of rails; and
      the removable component is connected to the base component at the welding surface of the removable component.

15. The machine of claim 14,
wherein the dump body is a unified dump body.

16. The machine of claim 14,
wherein the removable component is connected to the base component at the welding surface of the removable component via one or more welds.

17. The machine of claim 14,
wherein the removable component is associated with a rear portion of the dump body, and the base component is associated a front portion of the dump body.

18. The machine of claim 14,
wherein the base component includes a floor that is parallel to a reference axis, and
    wherein at least a portion of the floor of the removable component is disposed at a non-zero angle to the reference axis.

19. The removable component of claim 2, wherein the rib is on a bottom of the removable component.

20. The removable component of claim 2, wherein the rib extends in a direction that is orthogonal to a direction in which the first rail and the second rail extend.

\* \* \* \* \*